US011347788B2

(12) United States Patent
Codevilla et al.

(10) Patent No.: US 11,347,788 B2
(45) Date of Patent: May 31, 2022

(54) SYSTEMS AND METHODS FOR GENERATING A REQUESTED IMAGE VIEW

(71) Applicant: TOYOTA RESEARCH INSTITUTE, INC., Los Altos, CA (US)

(72) Inventors: Felipe Codevilla, Los Altos, CA (US); Eder Santana, Los Altos, CA (US); Adrien D. Gaidon, Los Altos, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 416 days.

(21) Appl. No.: 16/249,343

(22) Filed: Jan. 16, 2019

(65) Prior Publication Data

US 2020/0226175 A1 Jul. 16, 2020

(51) Int. Cl.
*G06F 16/00* (2019.01)
*G06F 16/587* (2019.01)
*H04N 19/597* (2014.01)
*G01C 21/36* (2006.01)
*G06F 16/56* (2019.01)
*G06F 16/538* (2019.01)
*G06F 16/29* (2019.01)

(52) U.S. Cl.
CPC ....... *G06F 16/587* (2019.01); *G01C 21/3667* (2013.01); *G06F 16/29* (2019.01); *G06F 16/538* (2019.01); *G06F 16/56* (2019.01); *H04N 19/597* (2014.11)

(58) Field of Classification Search
None
See application file for complete search history.

(56) References Cited

U.S. PATENT DOCUMENTS

| 7,962,281 | B2* | 6/2011 | Rasmussen | G01C 21/3673 |
| | | | | 701/429 |
| 9,179,124 | B2* | 11/2015 | Kim | H04N 19/597 |
| 9,286,524 | B1 | 3/2016 | Mei | |
| 10,897,293 | B2* | 1/2021 | Zhang | H04B 7/0478 |
| 2009/0219282 | A1* | 9/2009 | Kim | H04N 19/50 |
| | | | | 345/419 |
| 2009/0295907 | A1* | 12/2009 | Kim | H04N 13/189 |
| | | | | 348/43 |
| 2012/0293614 | A1* | 11/2012 | Ikeda | G11B 27/105 |
| | | | | 348/42 |

(Continued)

*Primary Examiner* — Jean M Corrielus
(74) *Attorney, Agent, or Firm* — Sheppard, Mullin, Richter & Hampton LLP; Hector A. Agdeppa; Daniel N. Yannuzzi

(57) ABSTRACT

Systems and methods for generating a requested image view are disclosed. Exemplary implementations may: electronically store map information and contextual information for an area; receive a query for the requested image view; determine, based on the parameter values specified by the query and the map information, values of the physics-based metric; translate the contextual information to a translated representation of the contextual information; encode, based on the translated representation of the contextual information and the values of the physics-based metric, an image file that defines the requested image view such that the translated representation of the contextual information and the values of the physics-based metric are combined; and generate the requested image view by decoding the image file.

10 Claims, 6 Drawing Sheets

(56) References Cited

U.S. PATENT DOCUMENTS

| | | | |
|---|---|---|---|
| 2013/0176384 A1* | 7/2013 | Jones | G06T 3/0087 |
| | | | 348/36 |
| 2013/0321472 A1* | 12/2013 | Piemonte | G06F 1/1626 |
| | | | 345/672 |
| 2016/0320202 A1* | 11/2016 | Horovitz | G06F 16/9537 |
| 2017/0351712 A1* | 12/2017 | Jung | G06F 16/5838 |
| 2017/0351952 A1 | 12/2017 | Zhang | |
| 2018/0247201 A1 | 8/2018 | Liu | |
| 2019/0146500 A1* | 5/2019 | Yalla | G01C 21/3602 |
| | | | 701/25 |
| 2020/0134054 A1* | 4/2020 | Viswanathan | G06N 3/08 |
| 2021/0194674 A1* | 6/2021 | Chen | G06F 21/6254 |

* cited by examiner

SYSTEMS AND METHODS FOR GENERATING A REQUESTED IMAGE VIEW

TECHNICAL FIELD

The present disclosure relates to systems and methods for generating a requested image view based on a query, map information, and contextual information.

BACKGROUND

Training and testing vehicles is essential for autonomous vehicles. To train and test the vehicles, driving simulators are built and utilized to increase the capabilities and sensory quality of what can be simulated. Simulators may include game engines and/or others that may be used for data generation for end-to-end driving systems, extensive demonstrations, and/or other purposes. However, building realistic simulators of real-world cities may be time consuming and exhaustive. Existing simulators may utilize simultaneous localization and mapping (SLAM), Structure from Motion (SfM), neural networks, and/or other 3D reconstruction techniques. However, these 3D reconstruction techniques may rely on non-robust features and may not be reasonable for environments with many dynamic objects.

BRIEF SUMMARY OF EMBODIMENTS

According to various embodiments of the disclosed technology, the present system that uses map information, contextual information, and queries specifying position and direction of view to generate a requested image view, the requested image view an unseen view in an area. Therefore, the system may render a part of a driving simulation without extensive description of an environment and/or limited assumptions of an environment. Furthermore, the system may generate the requested image view such that dynamic objects may be present.

One aspect of the present disclosure relates to a system that generates a requested image view. The system may include one or more hardware processors configured by machine-readable instructions. The processor(s) may be configured to electronically store map information and contextual information for an area. The contextual information may include images, depth information, and/or logging information that is indexed by position and direction of view. The processor(s) may be configured to receive a query for the requested image view. The query may specify parameter values for view parameters. The view parameters may include position and direction of view. The processor(s) may be configured to determine, based on the parameter values specified by the query and the map information, values of a physics-based metric. The processor(s) may be configured to translate the contextual information to a translated representation of the contextual information. The processor(s) may be configured to encode, based on the translated representation of the contextual information and the values of the physics-based metric, an image file that defines the requested image view such that the translated representation of the contextual information and the values of the physics-based metric are combined. The processor(s) may be configured to generate the requested image view by decoding the image file.

As used herein, the term "determine" (and derivatives thereof) may include measure, calculate, compute, estimate, approximate, generate, and/or otherwise derive, and/or any combination thereof.

Another aspect of the present disclosure relates to a method for generating a requested image view. The method may include electronically storing map information and contextual information for an area. The contextual information may include images, depth information, and/or logging information that is indexed by position and direction of view. The method may include receiving a query for the requested image view. The query may specify parameter values for view parameters. The view parameters may include position and direction of view. The method may include determining, based on the parameter values specified by the query and the map information, values of the physics-based metric. The method may include translating the contextual information to a translated representation of the contextual information. The method may include encoding, based on the translated representation of the contextual information and the values of the physics-based metric, an image file that defines the requested image view such that the translated representation of the contextual information and the values of the physics-based metric are combined. The method may include generating the requested image view by decoding the image file.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION OF THE EMBODIMENTS

Figure 1:
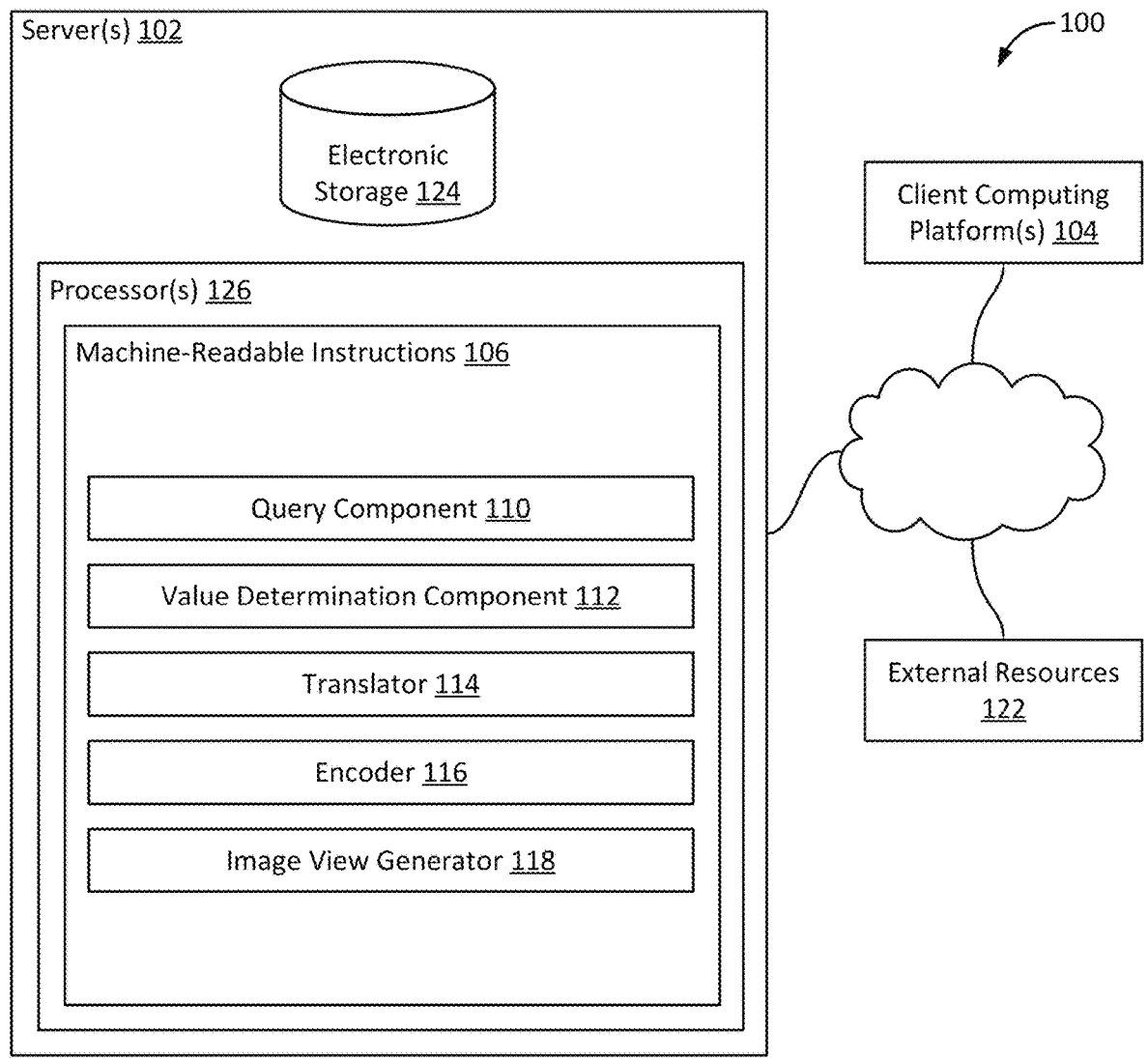
FIG. 1 illustrates a system configured for generating a requested image view, in accordance with one or more implementations.

FIG. 1 illustrates a system 100 that generates a requested image view, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of a query component 110, a value determination component 112, a translator 114, an encoder 116, an image view generator 118, and/or other instruction components.

Electronic storage 124 may be configured to electronically store map information and contextual information for an area. In some implementations, map information and/or contextual information may be obtained from a remote server. The map information may characterize an area. An area may include an urban area, city area, rural area, and/or other areas. The map information may be defined by parameter values for one or more map parameters. The map parameters may include one or more characteristics of a physical structure (e.g., latitude, longitude, GPS location, physical structure class (e.g., commercial, residential, industrial, etc.), etc.), traversable routes, physical boundaries, intersecting road names, nearby road names, length of a whole or part of a road, number of lanes, direction of traffic in lanes, relevant traffic signs and signals, traffic conditions, and/or others. The roadway may include a city road, urban road, highway, onramp, offramp, and/or others. Traffic conditions may include slowed speed of a roadway, increased speed of a roadway, decrease in number of lanes of a roadway, increase in number of lanes of a roadway, increase volume of vehicles on a roadway, and/or others. In some implementations, the contextual information may be based on sensors configured to generate output signals. By way of non-limiting example, the sensors may include virtual sensors, imaging sensors, depth sensors, cameras, and/or other sensors. As used herein, the term "sensor" may include any device that captures images, including but not limited to a single lens-based camera, a camera array, a solid-state camera, a mechanical camera, a digital camera, an image sensor, a depth sensor, a remote sensor, a lidar, an infrared sensor, a (monochrome) complementary metal-oxide-semiconductor (CMOS) sensor, an active pixel sensor, and/or other sensors. Individual sensors may be configured to capture information, including but not limited to visual information, video information, audio information, geolocation information, orientation and/or motion information, depth information, and/or other information. Information captured by one or more sensors may be marked, timestamped, annotated, and/or otherwise processed such that information captured by other sensors can be synchronized, aligned, annotated, and/or otherwise associated therewith. For example, contextual information captured by an image sensor may be synchronized with information captured by an accelerometer or other sensor. Output signals generated by individual image sensors (and/or information based thereon) may be stored and/or transferred in electronic files. The contextual information may include images, depth information, logging information, and/or other contextual information that is indexed by position and direction of view. Images may be of roadways, intersections, walkways, physical structures, and/or others. Depth information may include information relating to the distance of surfaces from a specific point of a sensor. Logging information may include recorded actions that occur in system 100; communications between a user and system 100; types, content, and/or times of actions and/or communications of system 100; and/or other recorded logs.

Query component 110 may be configured to receive a query for the requested image view. The requested image view may include, by way of non-limiting example, a roadway intersection, a roadway, a crosswalk, a walking path, and/or other image views. The query may specify parameter values for view parameters. The view parameters may include position (e.g., latitude, longitude, GPS location, etc.), direction of view, and/or other view parameters.

By way of non-limiting example, a query may specify view parameters with values of 33.8091° N, 117.9237° W and direction of view West such that an exact position and direction of view is specified. Query component 110 may receive the query for the requested image view such that value determination component 112 may utilize the view parameter values to determine values within the physics-based metric.

Value determination component 112 may be configured to determine values of the physics-based metric. Determination may be based on the parameter values specified by the query (i.e., values of the view parameters) and the map information. By way of non-limiting example, value determination component 112 may be a physics based simulator and/or engine that may use simple equations. The simple equations may update an observer state. The observer state may, for example, include position and direction of view, based on the query. The simple equations may be used to determine new values of the observer state. The values of the physics-based metric (i.e., the new values of the observer state) determined may be values more compatible and/or readable by encoder 116. By way of non-limiting example, positions and direction of view may be encoded either as their true numerical values or GPS representations and an image from a map area around the GPS coordinates of the GPS representation. In some implementations, value determination component 112 may be configured such that determination of the values of the physics-based metric are based on an action of a user, the query (i.e., values of the view parameters), and the map information. The user may include an autonomous vehicle and/or other users.

By way of non-limiting example, a user may be an autonomous vehicle that queries a position and direction of view of a requested image view. The autonomous vehicle may be using system 100 for training and may be in motion. Motion may be considered when determining values of the physics-based metric such that the values may be adjusted for generation of an image view, the image view portraying an upcoming view in addition to or alternatively to the exact position and direction of view specified within the query.

Translator 114 may be configured to translate the contextual information to a translated representation of the contextual information. The translated representation of the contextual information may be that the contextual information is organized for optimal generation of a requested image view from a query. In some implementations, translator 114 may be configured to translate the contextual information to the translated representation by hashing the contextual information, translating the contextual information to d-dimensional vectors, and/or other translation techniques. Translating the representation of the contextual information to d-dimensional vectors (i.e., d-dimensional embeddings)

may be translating high-dimensional vectors (i.e., the contextual information) to a low-dimensional space such that the contextual information is organized for optimal generation of a requested image view from a query. The d-dimensional vectors may be based on d parameter values in which the contextual information is organized by. Translation may aid machine learning on the contextual information, the contextual information representing a large amount of dynamic information.

Encoder 116 may be configured to encode an image file that defines the requested image view. Encoding an image file may be based on the translated representation of the contextual information and the values of the physics-based metric. Encoding an image file may combine the translated representation of the contextual information and the values of the physics-based metric. The image file may be representative code indicative of the requested image view, wherein the requested image view may be derived from decoding the image file.

Image view generator 118 may be configured to generate the requested image view by decoding the image file. In some implementations, image view generator 118 may be configured to generate the requested image view by decoding the image file using an auto-encoder. The auto-encoder may cause generation of the requested image view to be accelerated. The auto-encoder may include a variational auto-encoder, and/or other auto-encoders. A variational auto-encoder may map an input to a distribution rather than a fixed vector (as done in an auto-encoder) so the decoder of the auto-encoder may only need a sample of the distribution to generate an image view. The loss function is different in the variational auto-encoder than an auto-encoder as it comprises a reconstruction loss with respect to the distribution being sampled from, and a divergence term. The divergence term ensures the distribution is not too far removed from a mean of zero and a standard deviation of one.

By way of non-limiting example, system 100 may receive a query including 40.7484° N, 73.9857° W (i.e., the Empire State Building), North direction of view, specifying a position and direction of view representative of a requested image view. The map information may include cross street names of $6^{th}$ Ave. and $5^{th}$ Ave., block length of 995.66 feet, one lane road, road travels only in one direction, direction of travel is West, depth of a physical structure on the roadway is 1454 feet, and/or other map information. Based on the query and map information stored in electronic storage 124, values of a physic-based metric may be determined such that the values are readable by encoder 116. Furthermore, the contextual information stored in electronic storage 124 may be translated such that the contextual information is organized for optimal generation of the request image view. The contextual information may include images of the city roadway from the beginning of the block to the end, images from different viewpoints, depth of the surrounding buildings, time capture information of the images, and/or others. Encoder 116 may encode the values of the physics-based metric determined and the translated contextual information such that they are combined into an image file. The requested image view may be generated by decoding the image file such that the requested image view depicts a view of the area of the Empire State Building.

In some implementations, server(s) 102, client computing platform(s) 104, and/or external resources 122 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 122 may be operatively linked via some other communication media.

A given client computing platform 104 may include one or more processors configured to execute computer program components. The computer program components may be configured to enable an expert or user associated with the given client computing platform 104 to interface with system 100 and/or external resources 122, and/or provide other functionality attributed herein to client computing platform(s) 104. By way of non-limiting example, the given client computing platform 104 may include one or more of a vehicle, an autonomous vehicle, a desktop computer, a laptop computer, a handheld computer, a tablet computing platform, a NetBook, a Smartphone, a gaming console, and/or other computing platforms.

External resources 122 may include sources of information outside of system 100, external entities participating with system 100, and/or other resources. In some implementations, some or all of the functionality attributed herein to external resources 122 may be provided by resources included in system 100.

Server(s) 102 may include electronic storage 124, one or more processors 126, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 124 may comprise non-transitory storage media that electronically stores information. The electronic storage media of electronic storage 124 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 124 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 124 may include one or more virtual storage resources (e.g., cloud storage, a virtual private network, and/or other virtual storage resources). Electronic storage 124 may store software algorithms, information determined by processor(s) 126, information received from server(s) 102, information received from client computing platform(s) 104, and/or other information that enables server(s) 102 to function as described herein.

Processor(s) 126 may be configured to provide information processing capabilities in server(s) 102. As such, processor(s) 126 may include one or more of a digital processor, an analog processor, a digital circuit designed to process information, an analog circuit designed to process information, a state machine, and/or other mechanisms for electronically processing information. Although processor(s) 126 is shown in FIG. 1 as a single entity, this is for illustrative purposes only. In some implementations, processor(s) 126 may include a plurality of processing units. These processing units may be physically located within the same device, or processor(s) 126 may represent processing functionality of a plurality of devices operating in coordination. Processor(s) 126 may be configured to execute components 110, 112, 114, 116, and/or 118, and/or other components. Processor(s) 126 may be configured to execute components 110, 112, 114, 116, and/or 118, and/or other components by software; hardware; firmware; some combination of software, hardware, and/or firmware; and/or other mechanisms for configuring processing capabilities on processor(s) 126. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 110, 112, 114, 116, and/or 118 are illustrated in FIG. 1 as being implemented within a single processing unit, in implementations in which processor(s) 126 includes multiple processing units, one or more of components 110, 112, 114, 116, and/or 118 may be implemented remotely from the other components. The description of the functionality provided by the different components 110, 112, 114, 116, and/or 118 described below is for illustrative purposes, and is not intended to be limiting, as any of components 110, 112, 114, 116, and/or 118 may provide more or less functionality than is described. For example, one or more of components 110, 112, 114, 116, and/or 118 may be eliminated, and some or all of its functionality may be provided by other ones of components 110, 112, 114, 116, and/or 118. As another example, processor(s) 126 may be configured to execute one or more additional components that may perform some or all of the functionality attributed below to one of components 110, 112, 114, 116, and/or 118.

Figure 2:
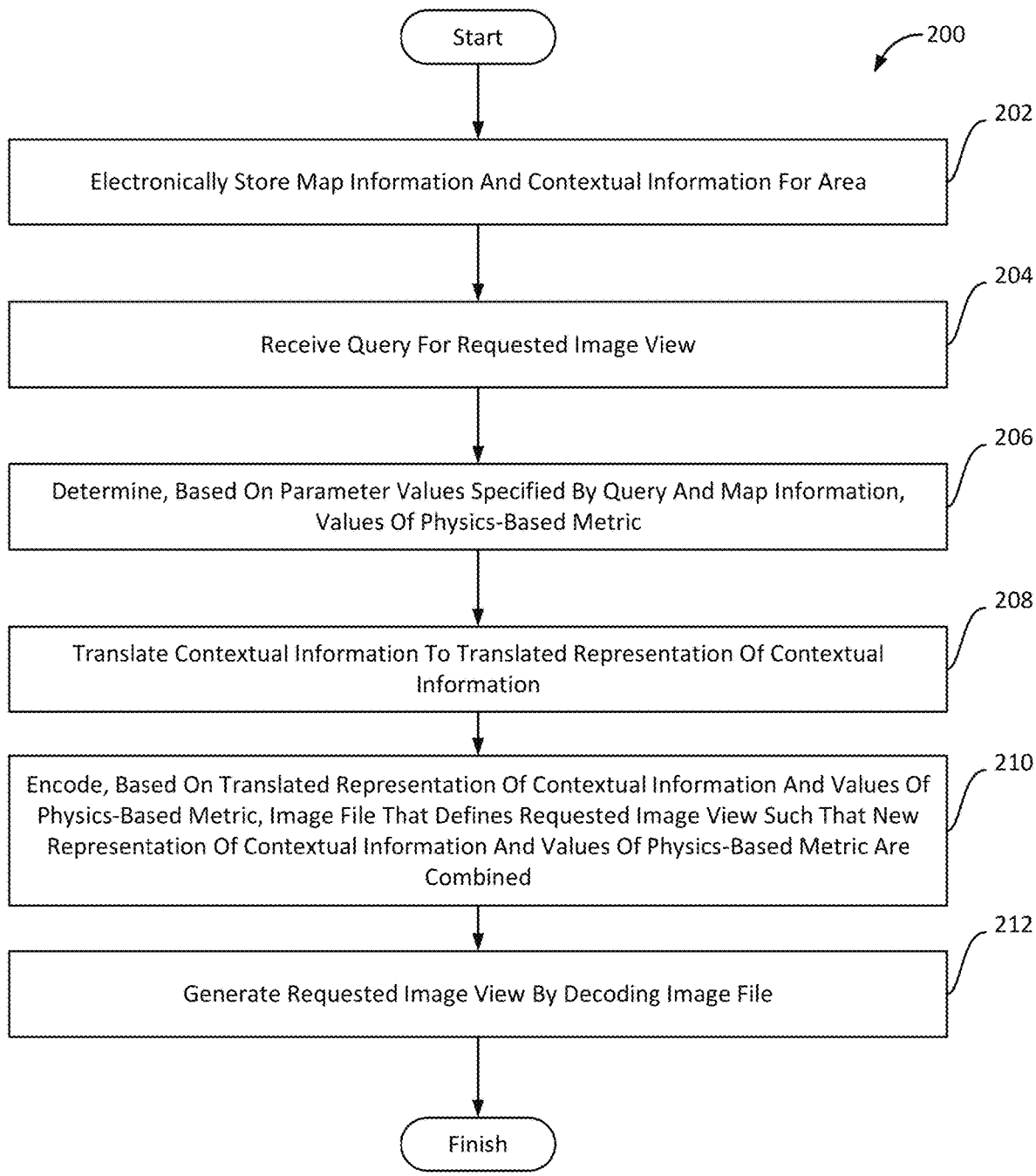
FIG. 2 illustrates a method for generating a requested image view, in accordance with one or more implementations.

FIG. 2 illustrates a method 200 for generating a requested image view, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include electronically storing map information and contextual information for an area. The contextual information may include images, depth information, and/or logging information that is indexed by position and direction of view. Operation 202 may be performed by one or more hardware processors configured by machine-readable instructions including a component that is the same as or similar to electronic storage 124, in accordance with one or more implementations.

An operation 204 may include receiving a query for the requested image view. The query may specify parameter values for view parameters. The view parameters may include position and direction of view. Operation 204 may be performed by one or more hardware processors configured by machine-readable instructions including a component that is the same as or similar to query component 110, in accordance with one or more implementations.

An operation 206 may include determining, based on the parameter values specified by the query and the map information, values of the physics-based metric. Operation 206 may be performed by one or more hardware processors configured by machine-readable instructions including a component that is the same as or similar to value determination component 112, in accordance with one or more implementations.

An operation 208 may include translating the contextual information to a translated representation of the contextual information. Operation 208 may be performed by one or more hardware processors configured by machine-readable instructions including a component that is the same as or similar to translator 114, in accordance with one or more implementations.

An operation 210 may include encoding, based on the translated representation of the contextual information and the values of the physics-based metric, an image file that defines the requested image view such that the translated representation of the contextual information and the values of the physics-based metric are combined. Operation 210 may be performed by one or more hardware processors configured by machine-readable instructions including a component that is the same as or similar to encoder 116, in accordance with one or more implementations.

An operation 212 may include generating the requested image view by decoding the image file. Operation 212 may be performed by one or more hardware processors configured by machine-readable instructions including a component that is the same as or similar to image view generator 118, in accordance with one or more implementations.

FIG. 3-6 illustrate an example implementation of generating a requested image view, in accordance with one or more implementations. FIG. 3-6 are not intended to be limiting.

Figure 3A:
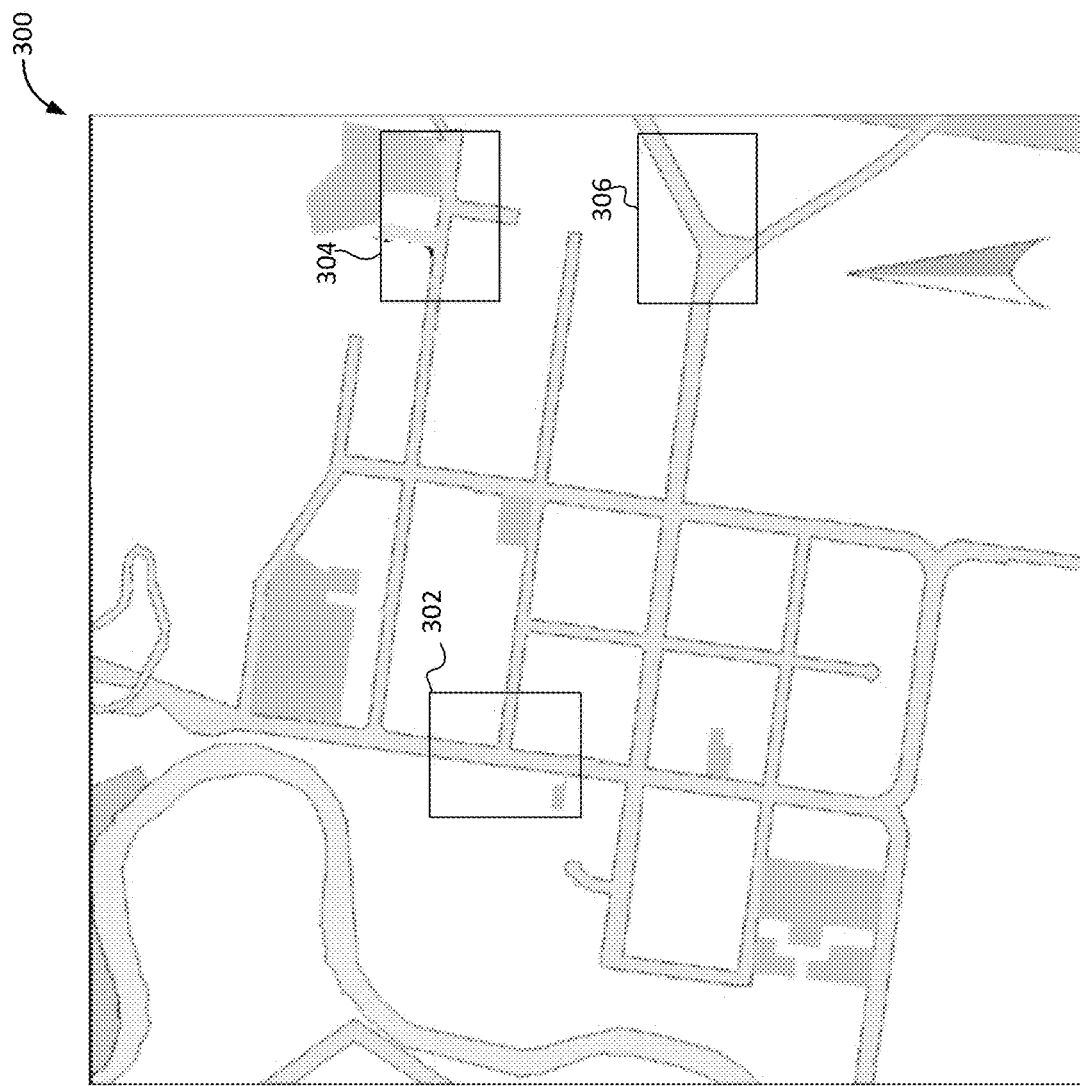
FIG. 3A illustrates map information for generating a requested image view, in accordance with one or more implementations.

FIG. 3A illustrates map information for generating a requested image view, in accordance with one or more implementations. FIG. 3A illustrates an aerial view of map 300 of an area. Map 300 includes segment 302, segment 304, and segment 306, wherein an image view may be requested of. Segment 302-306 may include a roadway, intersection, traffic signs, traffic signals, vehicles, and/or others.

Figure 3B:
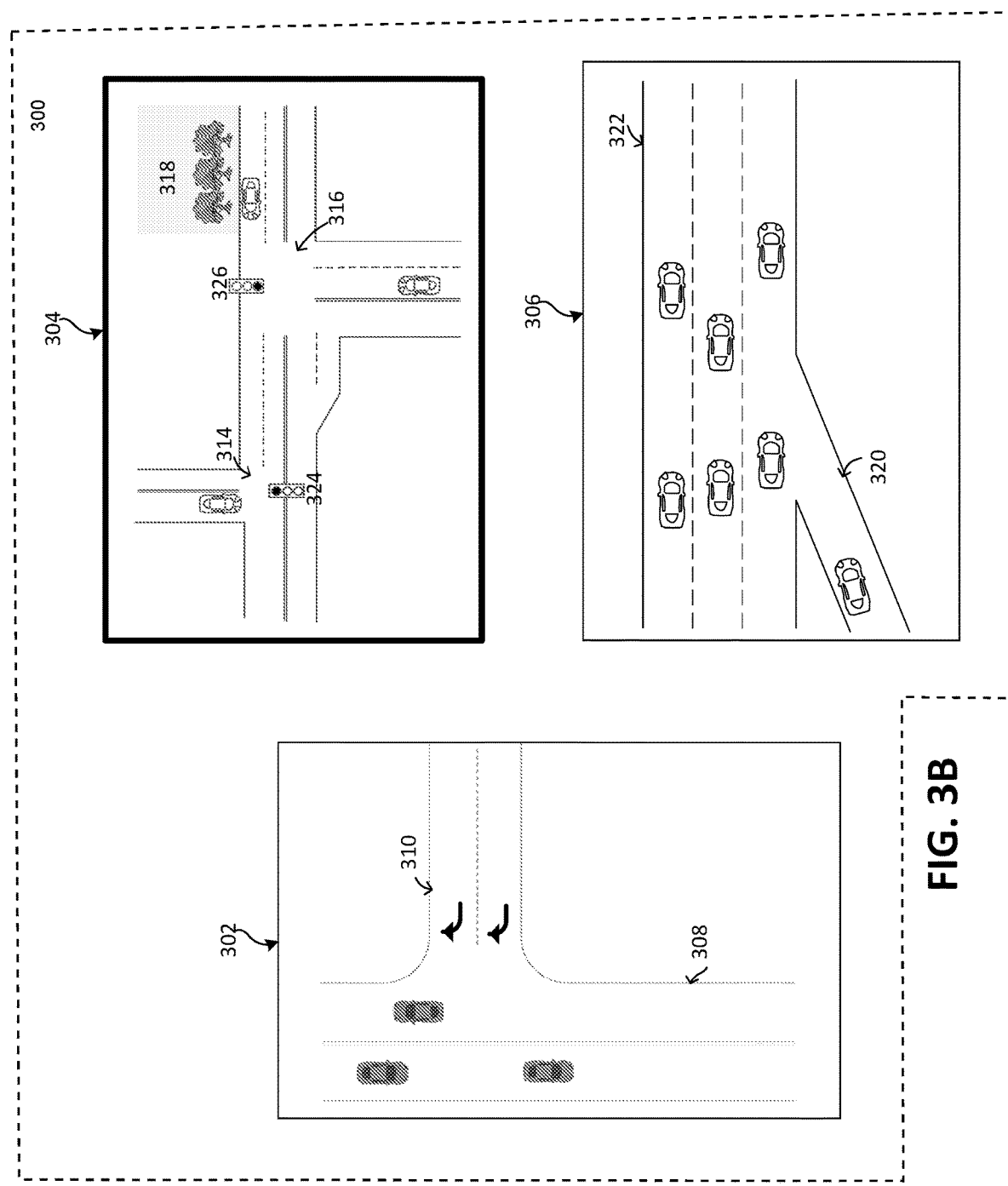
FIG. 3B illustrates map information for generating a requested image view, in accordance with one or more implementations.

FIG. 3B illustrates map information for generating a requested image view, in accordance with one or more implementations. Segment 302, segment 304, and segment 306 are further illustrated in FIG. 3B such that image views may be generated of the roadways in segments 302-306 from one or more directions of view. Segment 302 includes a 2-way roadway 308 and a one-way roadway 310. Segment 304 includes intersection 314, intersection 316, and park 318. Intersection 316 and 318 may include traffic lights 324 and 326, respectively. Segment 306 includes an onramp 320 onto a highway 322. Moreover, segment 304 has been selected to generate image views from.

Figure 4:
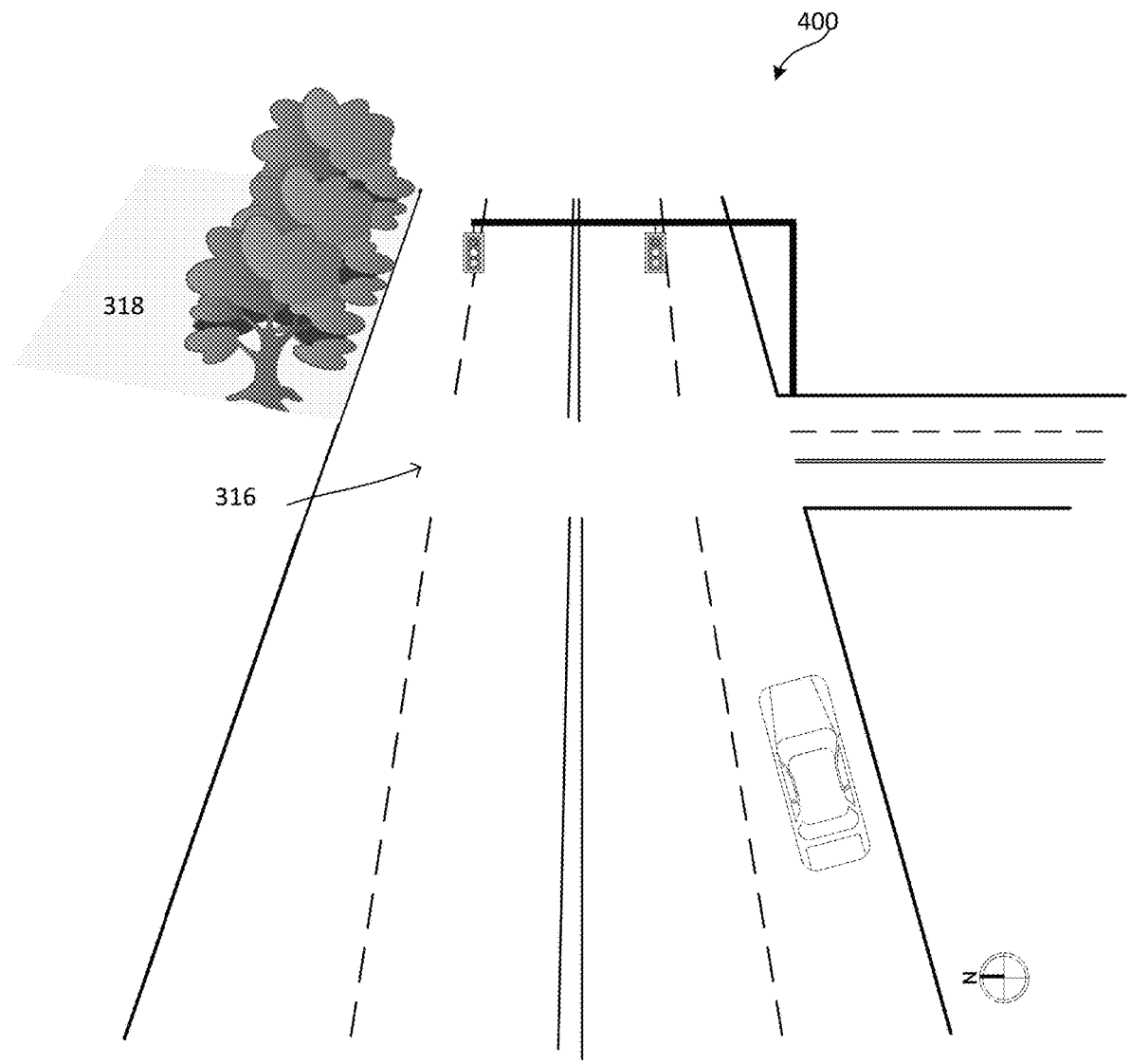
FIG. 4 illustrates a generated requested image view, in accordance with one or more implementations.

FIG. 4 illustrates a generated requested image view, in accordance with one or more implementations. View 400 further illustrates intersection 316 of segment 304. View 400 illustrates intersection 316 and park 318 through a direction of view facing East. View 400 may be generated from sensors present on traffic light 324 (as illustrated in FIG. 3B) and/or other sensors. View 400 may be one of a plurality of direction of views of segment 304.

Figure 5:
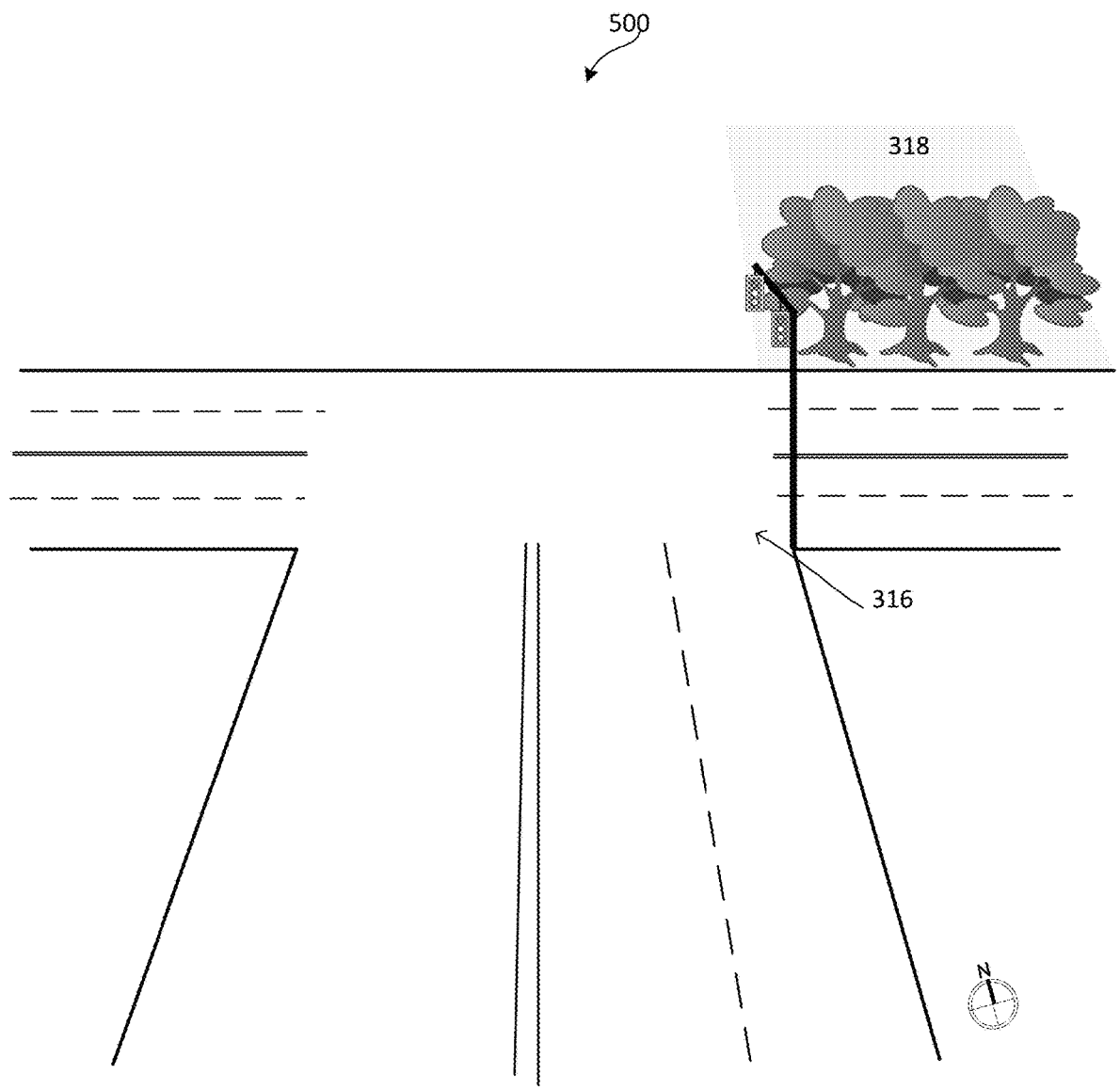
FIG. 5 illustrates a generated requested image view, in accordance with one or more implementations.

FIG. 5 illustrates a generated requested image view, in accordance with one or more implementations. View 500 further illustrates intersection 316 of segment 304. View 500 illustrates intersection 316 and park 318 through a direction of view facing North. View 500 may be one of a plurality of direction of views of segment 304.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system that generates a requested image view, the system comprising:
   electronic storage media configured to electronically store map information and contextual information for an area, the contextual information including images, depth information, and/or logging information that is indexed by position and direction of view; and
   one or more processors configured by machine-readable instructions to:
   receive a query for the requested image view, the query specifying parameter values for view parameters, the view parameters including position and direction of view;
   determine, based on the parameter values specified by the query and the map information, values of a physics-based metric, wherein the values of the physics-based metric is based on an action of a user, and wherein the user includes an autonomous vehicle;
   translate the contextual information to a translated representation of the contextual information;
   encode, based on the translated representation of the contextual information and the values of the physics-based metric, an image file that defines the requested image view such that the translated representation of the contextual information and the values of the physics-based metric are combined; and
   generate the requested image view by decoding the image file using an auto-encoder, wherein the auto-encoder includes a variational auto-encoder that maps an input to a distribution rather than a fixed vector, wherein the generation of the requested view is accelerated by the auto-encoder.

2. The system of claim 1, wherein the one or more processors are further configured by machine-readable instructions such that translating the contextual information to the translated representation includes hashing the contextual information and/or translating the contextual information to d-dimensional vectors.

3. The system of claim 1, wherein the map information includes values of map parameters, the map parameters including one or more characteristics of physical structures, traversable routes, intersecting roads, and/or physical boundaries.

4. The system of claim 1, wherein the contextual information is based on sensors configured to generate output signals.

5. The system of claim 4, wherein the sensors include virtual sensors, imaging sensors, and/or depth sensors.

6. A method for generating a requested image view, the method comprising:
   electronically storing map information and contextual information for an area, the contextual information including images, depth information, and/or logging information that is indexed by position and direction of view;
   receiving a query for the requested image view, the query specifying parameter values for view parameters, the view parameters including position and direction of view;
   determining, based on the parameter values specified by the query and the map information, values of a physics-based metric, wherein the values of the physics-based metric is based on an action of a user, wherein the user includes an autonomous vehicle;
   translating the contextual information to a translated representation of the contextual information;
   encoding, based on the translated representation of the contextual information and the values of the physics-based metric, an image file that defines the requested image view such that the translated representation of the contextual information and the values of the physics-based metric are combined; and
   generating the requested image view by decoding the image tile using an auto-encoder, wherein the auto-encoder includes a variational auto-encoder that maps an input to a distribution rather than a fixed vector, wherein the generation of the requested view is accelerated by the auto-encoder.

7. The method of claim 6, further comprising translating the contextual information to the translated representation includes hashing the contextual information and/or translating the contextual information to d-dimensional vectors.

8. The method of claim 6, wherein the map information includes values of map parameters, the map parameters including one or more characteristics of physical structures, traversable routes, intersecting roads, and/or physical boundaries.

9. The method of claim 6, wherein the contextual information is based on sensors configured to generate output signals.

10. The method of claim 9, wherein the sensors include virtual sensors, imaging sensors, and/or depth sensors.

* * * * *